United States Patent [19]

Fujimoto et al.

[11] Patent Number: 5,318,833

[45] Date of Patent: Jun. 7, 1994

[54] POLYESTER FILM COMPRISING SPECIFIC POROUS SILICA PARTICLES

[75] Inventors: Masahiko Fujimoto; Kazuo Endo, both of Yokohama, Japan

[73] Assignee: Diafoil Hoechst Company, Limited, Tokyo, Japan

[21] Appl. No.: 857,184

[22] Filed: Mar. 25, 1992

[30] Foreign Application Priority Data

Mar. 28, 1991 [JP] Japan ................................ 3-064870

[51] Int. Cl.$^5$ ............................................ B32B 3/26
[52] U.S. Cl. ............................... 428/304.4; 423/339; 428/307.3; 428/331; 428/402; 428/480; 428/910
[58] Field of Search ............ 428/331, 480, 402, 307.3, 428/304.4, 910; 423/339

[56] References Cited

U.S. PATENT DOCUMENTS 4,497,918 2/1985 Wason .
4,780,356 10/1988 Otouma et al. ..................... 428/212
4,895,759 1/1990 Crawford ........................... 420/331
4,990,400 2/1991 Endo et al. ......................... 428/331
5,077,118 12/1991 Hasegawa et al. .................. 428/149

FOREIGN PATENT DOCUMENTS 0257611 3/1988 European Pat. Off. .
423402 4/1991 European Pat. Off. .

*Primary Examiner*—Paul J. Thibodeau
*Assistant Examiner*—H. Thi Lê
*Attorney, Agent, or Firm*—Foley & Lardner

[57] ABSTRACT

A polyester film having uniform surface and excellent running property and transparency is disclosed. Said polyester film is characterized by containing 0.01-5 wt. % of porous precipitated silica particles which are coagulates of primary particles having an average particle diameter of 0.01-0.1 μm and have a pore volume of 0.05-0.5 ml/g, a specific surface area of 30-150 m$^2$/g and an average particle diameter of 0.1-0.5 μm.

20 Claims, No Drawings

POLYESTER FILM COMPRISING SPECIFIC POROUS SILICA PARTICLES

FIELD OF THE INVENTION

The present invention relates to a polyester film which contains silica particles having specific physical properties and has excellent surface and running properties.

BACKGROUND OF THE INVENTION

Polyester films typified by polyethylene terephthalate have excellent physical and chemical properties and thus are used in various fields such as graphic art, display, wrapping, base film for magnetic recording media, dielectric materials for condenser, etc.

In order to manufacture polyester films having excellent properties, it is essential to impart good running property to the film in the aspects of passing through the manufacturing steps, finishing steps after the film is coated by application or vapor deposition or handling of the product per se. Polyester films, however, are not entirely satisfactory in this respect. The deficiency is, in most cases, manifested by friction and abrasion caused when the film slides in contact with apparatus parts at high speed.

It is well known to properly roughen the surface of films in order to improve their running property and abrasion resistance. In order to achieve this object, fine particles are incorporated in the polyester. Although this is practically employed in industry to some degree, it is not always successful in providing the desired properties.

For instance, when the so-called precipitated particles, which are formed from the catalyst residue during the preparation of polyester, are employed, control of the amount of the particles, particle diameter, prevention of formation of coarse particles, etc. are difficult. Such particles are easily broken when the film is drawn (stretched) and do not bring about good running property and abrasion resistance. Also recycled use of such films is difficult.

Another means is to add inorganic particles of calcium carbonate, titanium dioxide, calcium phosphate, etc., which are inert to polyester. These particles are not subject to breakdown or deformation during the drawing and form rather steep protrusions and, therefore, bring about good running property. However, these particles have poor affinity with polyester and void spaces are formed around the particles when the film is drawn, which markedly degrades the transparency of the film. Also, these particles easily come off from the film surface and become white dust.

It is known to use silica particles which have relatively good affinity with polyester (Japanese Laying-Open Patent Publication No.37-12150 and 53-453696, for instance). As described in Japanese Laying Open Patent Publication No. Sho 43-23960, however, the dispersibility of silica particles in polyester is very poor and, therefore, they coagulate during the synthesis of polyester causing formation of coarse protrusions on the surface of the resulting film and degrading the transparency of the film. Further there is some difficulty that silica reduces the polymerization rate and degrades the thermal stability of the resulting film. The reason for this is not entirely clear but it is surmised that silanol groups existing on the surface of silica particles might react with the metal compound as the polymerization catalyst and the metal compound might be partially trapped by the silica.

We conducted intensive research in order to obtain a film provided with excellent surface properties, running property and other characteristics required for a base film and found that such a film can be obtained by incorporating silica particles which have specific physical properties and completed this invention.

DISCLOSURE OF THE INVENTION

The gist of the present invention resides in a polyester film characterized by containing 0.01–5 wt. %, preferably 0.1–3 wt. %, of porous precipitated silica particles which are coagulated particles of primary particles each having an average particle diameter of 0 01–0.1 μm, preferably 0.03–0.08 μm, and have a pore volume of 0.05–0.5 ml/g, preferably 0.07–0.3 ml/g, a specific surface area of 30–150 m$^2$/g, preferably 50–130 m$^2$/g and an average particle diameter of 0.1–5 μm, preferably 0.2–3 μm.

The invention will be described below in details.

The term "polyester" as used in the present invention means polyester which is prepared from an aromatic dicarboxylic acid such as terephthalic acid, 2,6-naphthalenedicarboxylic acid, etc. or an ester thereof and a glycol and may contain a third component. Specific examples the dicarboxylic acid are iso-phthalic acid, terephthalic acid, 2,6-naphthalenedicarboxylic, adipic acid and sebacic acid, etc. Specific examples of the glycol component are ethylene glycol, diethylene glycol, propylene glycol, butanediol, 1,4-cyclohexanedimethanol, neopentylglycol, etc. or mixtures thereof. The polyester used in the present invention preferably contains not less than 80% of repeating units of ethylene terephthalate or ethylene-2,6-naphthalate units.

In the present invention, the "polyester film" means a polyester film which is prepared from the above-described polyester and oriented at least in one direction. Such polyester film can be prepared by a method known per se. For instance, the film can be prepared by melt-extruding the polyester into a sheet at 270°–320° C., cooling to 40°–80° C. to solidify the sheet, longitudinally and transversally stretching the thus prepared amorphous sheet simultaneously or sequentially by a factor of 4–20 in area and finally heat-treating it at 160°–250° C. (the method disclosed in Japanese Patent Publication No. Sho 30-5639 for instance). The longitudinal and transversal, i.e., biaxial stretching can be effected in one step or in a plurality of steps. In the case of multiple step stretching, a heat treatment step for orientation relaxation can be interposed. After the biaxial stretching and before the heat treatment, an additional stretching step or steps can be interposed. This additional stretching can be effected in one direction or both directions.

The present invention is characterized by using, as particles to be incorporated in the polyester film, specific silica particles, which satisfy specific conditions with respect to the average particle diameter of the primary particles which constitute the silica particles, specific surface areas and the pore volume of the coagulated particles, The term "primary particle" as referred to in the present specification means the smallest silica particle unit which can be discriminated as one particle. In the present invention, particles comprising a plurality of primary particles which are partially chemically bonded to each other are used.

The above-described silica particles can be prepared by a so-called wet process, a reaction of sodium silicate and a mineral acid, for instance, to produce particles principally comprising silica. The conditions of the particles can be controlled by adjusting reaction temperature, conditions of ions that are present, etc.

Silica particles obtained by a wet process are porous silica particles which usually have a specific surface area of 300–700 $m^2/g$ (by the BET method) and a pore volume of 0.7–2 ml/g and contain many silanol groups on the surface and in the interior. When such porous silica particles are incorporated in polyester, the particles are more or less deformed as the film is prepared by drawing, that is, they well follow the drawing and thus exhibit good affinity to polyester film. The resulting film has excellent abrasion resistance.

Generally, particles are incorporated in polyester by adding a slurry of the particles in the reaction mixture during the synthesis thereof. If ordinary porous silica particles are used, the particles are often triturated into smaller particles and the resulting fine particles again coagulate, thus irregularity in the particle size is caused during the preparation of the slurry.

When silica particles contain many silanol groups, they are apt to coagulate by the interaction of the silanol groups. When silica particles containing many silanol groups are added to the reaction mixture, the polymerization reaction is retarded as mentioned above.

The primary particles constituting the porous precipitated silica particles used in the present invention should have an average particle diameter of 0.01–0.1 $\mu m$. The particles having a particle diameter of less than 0.01 $\mu m$ are apt to be broken down to ultrafine particles, which coagulate again. The particles having an average particle diameter of more than 0.1 $\mu m$ have poor porosity and thus poor affinity to polyester.

The porous precipitated silica particles used in the present invention should have a pore volume of 0.05–0.5 ml/g and a specific surface area of 30–150 $m^2/g$. Particles having a pore volume smaller than 0.05 ml/g or a specific surface area of smaller than 30 $m^2 g$ have poor porosity. Particles having pore volumes larger than 0.5 ml/g or a specific surface area larger than 150 $m^2/g$ have a large number of silanol groups.

The porous precipitated silica particles to be used in the present invention should have an average particle diameter of 0.1–5 $\mu m$, preferably 0.2–3 $\mu m$. With particles having an average particle diameter smaller than 0 1 $\mu m$, the resulting film is poor in running property and abrasion resistance. With particles having an average particle diameter larger than 5 $\mu m$, the resulting film has too high a surface roughness.

The content of the porous precipitated silica particles in the polyester film should be 0.01–5 wt. %, preferably 0.1–1 wt. %. When the content is less than 0.01 wt. %, the resulting film is insufficient in running property and abrasion resistance. When the content is larger than 5 wt. %, the resulting film has too high a surface roughness.

The manner of incorporating the silica particles in polyester in the present invention is not specifically defined but can be effected by any known method. However, it is preferred to add them in the form of a slurry, a dispersion in ethylene glycol for instance, at any stage in the preparation of the polyester, preferably after the esterification or transesterification and before the polymerization.

The slurry can be prepared by any known technique. For instance, the particles can be dispersed in ethylene glycol by means of a high speed mixer provided with a plurality of shearing blades arranged in parallel with the rotation of agitating wings, a homomixer, an ultrasonic disperser, etc.

The obtained slurry is preferably filtered with a screen of 1000 mesh or smaller in order to remove coarse particles and undispersed coagulated particles.

The surface property, running property and abrasion resistance of polyester film can be highly improved by incorporating silica particles having specific properties in the polyester. The resulting film is especially suitable as base film for electrical appliances such as magnetic recording media represented by magnetic tape and flexible magnetic discs as well as condensers. The application of the film is not limited thereto but the film is be useful as a base film for photographic printing plate and packaging, etc.

Other particles, e.g., those of kaolin, talc, calcium carbonate, aluminum oxide, particles of cross-linked high polymer, etc., can be used in addition to the above described silica particles as desired within the gist of the invention.

SPECIFIC DESCRIPTION OF THE INVENTION

The invention will now be described specifically in detail by way of working examples. However, the invention is not limited to these examples but by the scope of the gist of the invention. The definitions and methods of measurement of the properties and characteristics referred to in the following examples are as follows: The term "parts" in the examples means "parts by weight"

(1) Particle diameter

The average particle diameter of silica particles means the diameter at 50% of the integral volume percentage in the equivalent sphere distribution measured with a centrifugal sedimentation particle distribution measurement apparatus (SA-CP3) manufactured by Shimazu Seisakusho.

The particle diameter of the primary particles was measured by graphic processing of electron microscope images.

(2) Pore volume and specific surface area

Pore volume and specific surface area were measured by nitrogen adsorption-desorption method using a fulautomatic surface area measurement apparatus (manufactured by Carlo Elba, S.p.A.).

(3) Intrinsic viscosity

Intrinsic viscosity of polymer was measured at 30.0° C. using a solution of 1 g of polymer in 100 ml of phenol-tetrachloroethane mixture (50/50 by weight).

(4) Running property

Two strips of film 15 mm in width and 150 mm in length were placed one over another on a smooth glass plate, a rubber plate was placed thereon so as to give a contact pressure of 2 $g/cm^2$ and one strip was slid over the other at the rate of 20 mm/min. The friction coefficient was measured and the friction coefficient at the point the film slid by 5 mm was taken as the dynamic friction coefficient. This was made an index of running property.

The measurement was carried out at 23±1° C. under the RH of 50±5%.

(5) Abrasion resistance

The abrasion resistance of film was evaluated by the amount of produced white powder when the film was slid over a fixed pin. A film (tape) was contacted with the surface of a fixed hard chromium-plated pin having a diameter of 6 mm over an angle of 135° and slid over 1000 m at the rate of 13 m/min with a tension of about 200 g. The amount of the produced white powder adhering the pin was visually observed and rated as follows.

A: No powder adhering
B: A slight amount of powder adhering
C: A little amount (larger than B) of powder adhering
D: A large amount of powder adhering (6) Number of coarse protrusions A 10 mg (polymer) sample was precisely weighed and placed between two 18×18 mm cover glass plates and hotpressed at 280°-290° C. so as to form a film piece having pressed at 280°-290° C. so as to form a film piece having a diameter of 10 mm. This film was observed under a phase difference microscope (x100) and the number of particles having a diameter of 10 μm or larger was counted. The value was taken as the number of coarse protrusions.

Example 1

(Preparation of slurry)

Ten (10) parts of precipitated silica particles, which were each a coagulate of primary particles having an average particle diameter of 0.05 μm and had an average particle diameter of 0.50 μm, a pore volume of 0.09 ml/g and a specific surface area of 70 m²/g, were added to 90 parts of ethylene glycol and dispersed by means of a homomixer ("TK Homomixer" manufactured by Tokushu Kika Kogyo Kabushiki Kaisha) at 10000 rpm for 60 min. The resulting dispersion was filtered with a 1000 mesh wire screen. Thus a silica particle ethylene glycol slurry was obtained.

(Preparation of polyester)

In a reactor, 100 parts of dimethyl terephthalate, 60 parts of ethylene glycol and 0.09 parts of magnesium acetate tetrahydrate were placed and heated. Transesterification was allowed to proceed by heating and distilling off produced methanol as the temperature rose. After 4 hours, the temperature reached 230° C. and the transesterification was substantially completed. Then 3 parts of the above-described slurry was added to the reaction mixture and further 0.04 parts of ethyl acid phosphate and 0.04 parts of antimony trioxide were added. Thus polycondensation reaction was allowed to proceed. After 4 hours and 15 minutes, polyethylene terephthalate having an intrinsic viscosity of 0.660 was obtained.

The obtained polyester was dried and melt-extruded at 290° C. into an amorphous polyester sheet, which was longitudinally stretched at 90° C. by a factor of 3.5, transversally stretched at 110° C. by a factor of 3.7 and finally heat-treated at 210° C. for 3 seconds. Thus a 15 μm thick film was obtained and the characteristics were evaluated.

Example 2

Using precipitated silica particles, which were each a coagulate of primary particles having an average particle diameter of 0.02 μm and had an average particle diameter of 0.50 μm, a pore volume of 0.15 ml/g and a specific surface area of 133 m²/g, the polycondensation reaction was carried out in the same manner as in Example 1. After 4 hours and 20 minutes, polyethylene terephthalate having an intrinsic viscosity of 0.661 was obtained. A film was obtained in the same manner as in Example 1 and the characteristics thereof were evaluated.

Example 3

Using precipitated silica particles, which were each a coagulate of primary particles having an average particle diameter of 0.07 μm and had an average particle diameter of 1.20 μm, a pore volume of 0.25 ml/g and a specific surface area of 90 m²/g, the polycondensation reaction was carried out ion the same manner as in Example 1. After 4 hours and 10 minutes, polyethylene terephthalate having an intrinsic viscosity of 0.664 was obtained.

A film was obtained in the same manner as in Example 1 and the characteristics thereof were evaluated.

Comparative Example 1

Using precipitated silica particles, which were each a coagulate of primary particles having an average particle diameter of 0.005 μm and have an average particle diameter of 0.50 μm, a pore volume of 0.95 ml/g and a specific surface area of 210 m²/g, the polycondensation reaction was carried out in the same manner as in Example 1. After 5 hours and 10 minutes, polyethylene terephthalate having an intrinsic viscosity of 0.651 was obtained. A film was obtained in the same manner as in Example 1 and the characteristics thereof were evaluated.

Comparative Example 2

Using precipitated silica particles, which were each a coagulate of primary particles having an average particle diameter of 0.3 μm and had an average particle diameter of 1.20 μm, pore volume of 0.04 ml/g and a specific surface area of 210 m²/g, the polycondensation reaction was carried out in the same manner as in Example 1. After 4 hours and 10 minutes, polyethylene terephthalate having a limiting viscosity of 0.651 was obtained. A film was obtained in the same manner as in Example 1 and the characteristics thereof were evaluated.

Comparative Example 3

Using precipitated silica particles, which were each a coagulate of primary particles having an average particle diameter of 0.05 μm and had an average particle diameter of 0.50 μm, a pore volume of 0.09 ml/g and a specific surface area of 70 m²/g, the polycondensation reaction was carried out in the same manner as in Example 1. After 5 hours and 40 minutes, polyethylene terephthalate having an intrinsic viscosity of 0.651 was obtained. A film was obtained in the same manner as in Example 1 and the characteristics thereof were evaluated.

TABLE 1

| | Silica Particles | | | | | Polymer Characteristics | | Film Characteristics | | |
|---|---|---|---|---|---|---|---|---|---|---|
| | Primary particles (μm) Part. diam. | Pore Vol. (ml/g) | Spec. Area (m²/g) | Average Diameter (μm) | Content (%) | Polymeriz'n Time | Intrinsic Vis'y | Running Prop. | Abrasion Resistance | No. of Coarse Protrusion |
| Ex. 1 | 0.05 | 0.09 | 70 | 0.50 | 0.3 | 4 hr. 15 min. | 0.660 | 0.36 | A | 3 |
| Ex. 2 | 0.02 | 0.15 | 133 | 0.50 | 0.3 | 4 hr. 20 min. | 0.661 | 0.32 | A | 5 |
| Ex. 3 | 0.07 | 0.25 | 90 | 1.20 | 0.3 | 4 hr. 10 min. | 0.664 | 0.32 | A | 5 |
| Comp. Ex. 1 | 0.005 | 0.95 | 210 | 0.50 | 0.3 | 5 hr. 10 min. | 0.651 | 0.44 | A | 35 |
| Comp. Ex. 2 | 0.3 | 0.04 | 25 | 1.20 | 0.3 | 4 hr. 10 min. | 0.665 | 0.40 | C | 8 |
| Comp. Ex. 3 | 0.05 | 0.09 | 70 | 0.50 | 6.0 | 5 hr. 40 min. | 0.651 | 0.22 | B | 74 |

The film of the present invention has a uniform surface as well as excellent running property and transparency, thus is applicable to various uses and industrially very valuable.

What we claim is:

1. A polyester film characterized by containing 0.01–5 wt. % of porous precipitated silica particles which are coagulates of primary particles,
    wherein the primary particles have an average particle diameter of 0.01–0.1 μm,
    and wherein the coagulates have a pore volume of 0.05–0.5 ml/g, a specific surface area of 30–150 m²/g, and an average particle diameter of 0.1–5 μm.

2. A polyester film as claimed in claim 1, wherein the content of the silica particles is 0.1–1 wt. %.

3. A polyester film as claimed in claim 1, wherein the particle diameter of the coagulates is 0.2–1 μm.

4. A polyester film as claimed in claim 1, wherein the pore volume of the coagulates is 0.07–0.3 ml/g.

5. A polyester film as claimed in claim 1, wherein the specific surface area of the coagulates is 50–130 m²/g.

6. A polyester film as claimed in claim 1, wherein the particle diameter of the primary particles is 0.03–0.8 μm.

7. A polyester film as claimed in claim 1, wherein the polyester film comprises a polyester prepared from an aromatic dicarboxylic acid or ester thereof and a glycol.

8. A polyester film as claimed in claim 7, wherein the polyester contains not less than 80% of repeating units of ethylene terephthalate or ethylene-2,6-naphthalate units.

9. A polyester film as claimed in claim 1, which is oriented in at least one direction.

10. A polyester film as claimed in claim 9, which is biaxially oriented.

11. A polyester film as claimed in claim 10, which is heat-treated.

12. A polyester film as claimed in claim 1, wherein the silica particles are added during the synthesis of the polyester which is used in the polyester film.

13. A polyester film as claimed in claim 11, wherein the particles are added to the glycol used to make the polyester, before the glycol is reacted to form the polyester.

14. A polyester film as claimed in claim 1, which further comprises additional particles.

15. A polyester film as claimed in claim 12, wherein the additional particles are one or more selected from the group consisting of kaolin, talc, calcium carbonate, aluminum oxide, and particles of crosslinked polymers.

16. A polyester film as claimed in claim 1, wherein the polyester film comprises polyethylene terephthalate.

17. A polyester film as claimed in claim 1, wherein the film consists essentially of the silica particles and polyester.

18. A polyester film as claimed in claim 1, which is 15 micrometers thick.

19. A polyester film as claimed in claim 1, which is a base film for an electrical appliance.

20. A polyester film as claimed in claim 1, which consists of a polyester film having incorporated the silica particles.

* * * * *